(12) United States Patent
Pesavento et al.

(10) Patent No.: US 7,877,537 B2
(45) Date of Patent: Jan. 25, 2011

(54) CONFIGURABLE CACHE FOR A MICROPROCESSOR

(75) Inventors: Rodney J. Pesavento, Chandler, AZ (US); Gregg D. Lahti, Gilbert, AZ (US); Joseph W. Triece, Phoenix, AZ (US)

(73) Assignee: Microchip Technology Incorporated, Chandler, AZ (US)

(*) Notice: Subject to any disclaimer, the term of this patent is extended or adjusted under 35 U.S.C. 154(b) by 442 days.

(21) Appl. No.: 11/928,479

(22) Filed: Oct. 30, 2007

(65) Prior Publication Data

US 2008/0147990 A1    Jun. 19, 2008

Related U.S. Application Data

(60) Provisional application No. 60/870,622, filed on Dec. 19, 2006, provisional application No. 60/870,188, filed on Dec. 15, 2006.

(51) Int. Cl.
*G06F 12/00* (2006.01)

(52) U.S. Cl. .............................. 711/3; 711/154; 711/212

(58) Field of Classification Search ................ 711/145, 711/3, 123, 154, 212
See application file for complete search history.

(56) References Cited

U.S. PATENT DOCUMENTS

| | | | | |
|---|---|---|---|---|
| 5,197,139 A | * | 3/1993 | Emma et al. ................. | 711/207 |
| 5,353,425 A | * | 10/1994 | Malamy et al. ............. | 711/144 |
| 5,655,096 A | * | 8/1997 | Branigin ..................... | 712/200 |
| 5,761,712 A | * | 6/1998 | Tran et al. ................... | 711/126 |
| 5,848,433 A | * | 12/1998 | Tran et al. ................... | 711/137 |
| 5,887,152 A | * | 3/1999 | Tran ........................... | 712/217 |
| 5,913,228 A | * | 6/1999 | Bedarida ..................... | 711/170 |
| 6,341,347 B1 | | 1/2002 | Joy et al. ..................... | 712/228 |
| 6,532,520 B1 | | 3/2003 | Dean et al. .................. | 711/133 |
| 6,598,128 B1 | * | 7/2003 | Yoshioka et al. ............ | 711/144 |
| 6,629,207 B1 | * | 9/2003 | Yoshioka et al. ............ | 711/125 |
| 6,957,306 B2 | | 10/2005 | So et al. ...................... | 711/137 |
| 2002/0116567 A1 | * | 8/2002 | Vondran, Jr. ................. | 711/3 |
| 2002/0156962 A1 | * | 10/2002 | Chopra et al. ............... | 711/3 |
| 2003/0070047 A1 | * | 4/2003 | Dwyer et al. ................ | 711/136 |

(Continued)

FOREIGN PATENT DOCUMENTS

EP    0 795 820 A2    2/1993

(Continued)

OTHER PUBLICATIONS

So What Is A Page Fault?; OSR Staff; OSR; May 6, 2003 (published) Jun. 7, 2003 (modified).*

(Continued)

*Primary Examiner*—Jack A Lane
(74) *Attorney, Agent, or Firm*—King & Spalding L.L.P.

(57) ABSTRACT

A cache module for a central processing unit has a cache control unit coupled with a memory, and a cache memory coupled with the control unit and the memory, wherein the cache memory has a plurality of cache lines, at least one cache line of the plurality of cache lines has an address tag bit field and an associated storage area for storing instructions to be issued sequentially and at least one control bit field, wherein the control bit field is coupled with the address tag bit field to mask a predefined number of bits in the address tag bit field.

20 Claims, 7 Drawing Sheets

U.S. PATENT DOCUMENTS

| | | | |
|---|---|---|---|
| 2004/0073771 A1* | 4/2004 | Chen et al. | 711/218 |
| 2005/0182903 A1* | 8/2005 | Kinter et al. | 711/133 |
| 2005/0235115 A1* | 10/2005 | Franaszek et al. | 711/133 |
| 2006/0179174 A1* | 8/2006 | Bockhaus et al. | 710/22 |
| 2006/0253660 A1* | 11/2006 | Hall | 711/154 |
| 2007/0150640 A1* | 6/2007 | Begon et al. | 711/3 |
| 2007/0186035 A1* | 8/2007 | Chiba | 711/108 |
| 2008/0052499 A1 | 2/2008 | Koc | 712/238 |
| 2008/0147978 A1 | 6/2008 | Pesavento et al. | 711/125 |

FOREIGN PATENT DOCUMENTS

| | | |
|---|---|---|
| EP | 1 729 220 A1 | 6/2006 |
| WO | 01/57675 | 8/2001 |

OTHER PUBLICATIONS

International Search Report and Written Opinion for PCT/US2007/087249 mailed Mar. 25, 2008.

International Search Report and Written Opinion; PCT/US2007/087600; pp. 12, Jun. 3, 2008.

Vanderwiel et al., "When Caches Aren't Enough: Data Prefetching Techniques", Computer, IEEE Service Center, Los Alamitos, CA, US. vol. 30, No. 7., 8 pages, Jul. 1, 1997.

International Search Report with Written Opinion PCT/US2007/087238, 14 pages, Jun. 11, 2008.

* cited by examiner

| | | | | | | | | | | |
|---|---|---|---|---|---|---|---|---|---|---|
| 0 | MASK | TAG | V | L | T | BT | Word3 | Word2 | Word1 | Word0 |
| 1 | MASK | TAG | V | L | T | BT | Word3 | Word2 | Word1 | Word0 |
| 2 | MASK | TAG | V | L | T | BT | Word3 | Word2 | Word1 | Word0 |
| 3 | MASK | TAG | V | L | T | BT | Word3 | Word2 | Word1 | Word0 |
| 4 | MASK | TAG | V | L | T | BT | Word3 | Word2 | Word1 | Word0 |
| 5 | MASK | TAG | V | L | T | BT | Word3 | Word2 | Word1 | Word0 |
| 6 | MASK | TAG | V | L | T | BT | Word3 | Word2 | Word1 | Word0 |
| 7 | MASK | TAG | V | L | T | BT | Word3 | Word2 | Word1 | Word0 |
| 8 | MASK | TAG | V | L | T | BT | Word3 | Word2 | Word1 | Word0 |
| 9 | MASK | TAG | V | L | T | BT | Word3 | Word2 | Word1 | Word0 |
| A | MASK | TAG | V | L | T | BT | Word3 | Word2 | Word1 | Word0 |
| B | MASK | TAG | V | L | T | BT | Word3 | Word2 | Word1 | Word0 |
| C | MASK | TAG | V | L | T | BT | Word3 | Word2 | Word1 | Word0 |
| D | MASK | TAG | V | L | T | BT | Word3 | Word2 | Word1 | Word0 |
| E | MASK | TAG | V | L | T | BT | Word3 | Word2 | Word1 | Word0 |
| F | MASK | TAG | V | L | T | BT | Word3 | Word2 | Word1 | Word0 |

CONFIGURABLE CACHE FOR A MICROPROCESSOR

CROSS-REFERENCE TO RELATED APPLICATIONS

This application claims the benefit of U.S. Provisional Application No. 60/870,622 filed on Dec. 19, 2006, entitled "LINKED BRANCH HISTORY BUFFER"; and U.S. Provisional Application No. 60/870,188 filed on Dec. 15, 2006, entitled "CONFIGURABLE PICOCACHE WITH PREFETCH AND LINKED BRANCH TRAIL BUFFERS, AND FLASH PREFETCH BUFFER", which are incorporated herein in their entirety.

TECHNICAL FIELD

The present invention concerns a configurable cache for a microprocessor or microcontroller.

BACKGROUND

The bottleneck for a pipelined microprocessor architecture is the high access time of the memory system. Classical approaches to solve this problem use large caches and transmit multiple data words per clock after an initial high memory access time. Small microcontroller designs are limited in the amount of cache that can be on chip and they cannot support the large sizes of high latency but high throughput narrow memory. Thus, a need for a configurable cache for a microcontroller or microprocessor exists.

SUMMARY

According to an embodiment, a cache module for a central processing unit may comprise a cache control unit coupled with a memory, and a cache memory coupled with the control unit and the memory, wherein the cache memory comprises a plurality of cache lines, at least one cache line of the plurality of cache lines comprises an address tag bit field and an associated storage area for storing instructions to be issued sequentially and at least one control bit field, wherein the control bit field is coupled with the address tag bit field to mask a predefined number of bits in the address tag bit field.

According to another embodiment, a microcontroller may comprise a central processing unit; a cache module coupled with the central processing unit comprising: a cache control unit coupled with a memory, and a cache memory coupled with the control unit and the memory, wherein the cache memory comprises a plurality of cache lines, at least one cache line of the plurality of cache lines comprises an address tag bit field and an associated storage area for storing instructions to be issued sequentially and at least one control bit field, wherein the control bit field is coupled with the address tag bit field to mask a predefined number of bits in the address tag bit field.

According to a further embodiment, the at least one cache line further may comprise at least one locking bit for locking of the associated cache line. According to a further embodiment, each cache line may comprise at least one locking bit for locking of the associated cache line. According to a further embodiment, each cache line further may comprise at least one branch trail bit for automatic locking of the associated cache line, wherein in case the branch trail bit is set the locking bit is automatically set in case a predefined branch instruction in the associated storage area has been issued. According to a further embodiment, each cache line further may comprise a validity control bit for indicating the validity of the associated cache line. According to a further embodiment, each cache line further may comprise a type control bit for indicating whether the cache line is used as an instruction cache line or a data cache line. According to a further embodiment, the cache module may further comprise a prefetch unit coupled with the memory and the cache memory, wherein the prefetch unit is operable to load instructions from the memory into another cache line wherein the instructions are sequential to instructions which are currently issued from the cache line. According to a further embodiment, a least recently used algorithm may be used to determine which cache line is to be overwritten.

According to yet another embodiment, a method of operating a cache having a plurality of cache lines for a central processing unit may comprise the steps of storing a plurality of sequential instructions within a cache line of the cache and an associated start address of the sequential instructions in an associated address tag bit field of the cache line; storing a mask in a mask bit field of the cache line; receiving an instruction address request; comparing the instruction address request to generate a hit or miss signal with a partial address generated by masking the associated address tag bit field with the mask bit field; accessing an instruction from the cache line if a hit signal has been generated.

According to a further embodiment, the instruction address request may be generated by an interrupt or by a trap instruction. According to a further embodiment, the interrupt or trap instruction may generate an address that consists of a base address and an offset address, wherein the offset is generated by an interrupt priority or by a trap number, respectively. According to a further embodiment, the method may further comprise the step of locking the cache line. According to a further embodiment, the method may further comprise the steps of storing a plurality of sequential instructions within another cache line of the cache; setting a branch trail function for the another cache line; executing instructions fetched from the another cache line; automatically locking the another cache line upon calling a subroutine. According to a further embodiment, the method may further comprise the step of resetting the branch trail function for the another cache line upon a return from the subroutine. According to a further embodiment, the subroutine may be called upon execution of an instruction contained in the another cache line.

BRIEF DESCRIPTION OF THE DRAWINGS

A more complete understanding of the present disclosure thereof may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Standard microcontroller units (MCU) usually comprise an 8-bit or 16-bit microprocessor core. Only recently have 32-bit core entered into the MCU arena. All these cores usually do not have Caches. Only complex high end 32-bit microcontrollers may have caches. This is because caches are large and costly for MCU. The disclosed embodiments provide for a middle ground of a small configurable cache that is configurable on the fly and may act as a prefetch and branch trail buffer while providing the optimal cache depth for MCU applications.

According to an embodiment, a cache can be designed to be configurable to operate very flexible. For example, it can be programmed to operate strictly as a cache, which is useful for small loop optimization. To this end, respective cache lines comprising the loop can be manually locked. It can also dedicate a certain number of cache lines, for example, up to half the lines for Linked Branch History storage, which can accelerate function call returns. Finally, it can be configured to prefetch sequential program information into the least recently used cache line when a first instruction is issued from a cache line. By prefetching program instructions at twice the rate the microprocessor can use them, the memory system provides available bandwidth to fetch program data without stalling program instruction flow. In practice, not all program data fetches are transparent. The cache design approach according to different embodiments provides a mechanism to improve performance by giving a balance of feature of a low latency cache combined with a high latency but high throughput wide memory.

Figure 1:
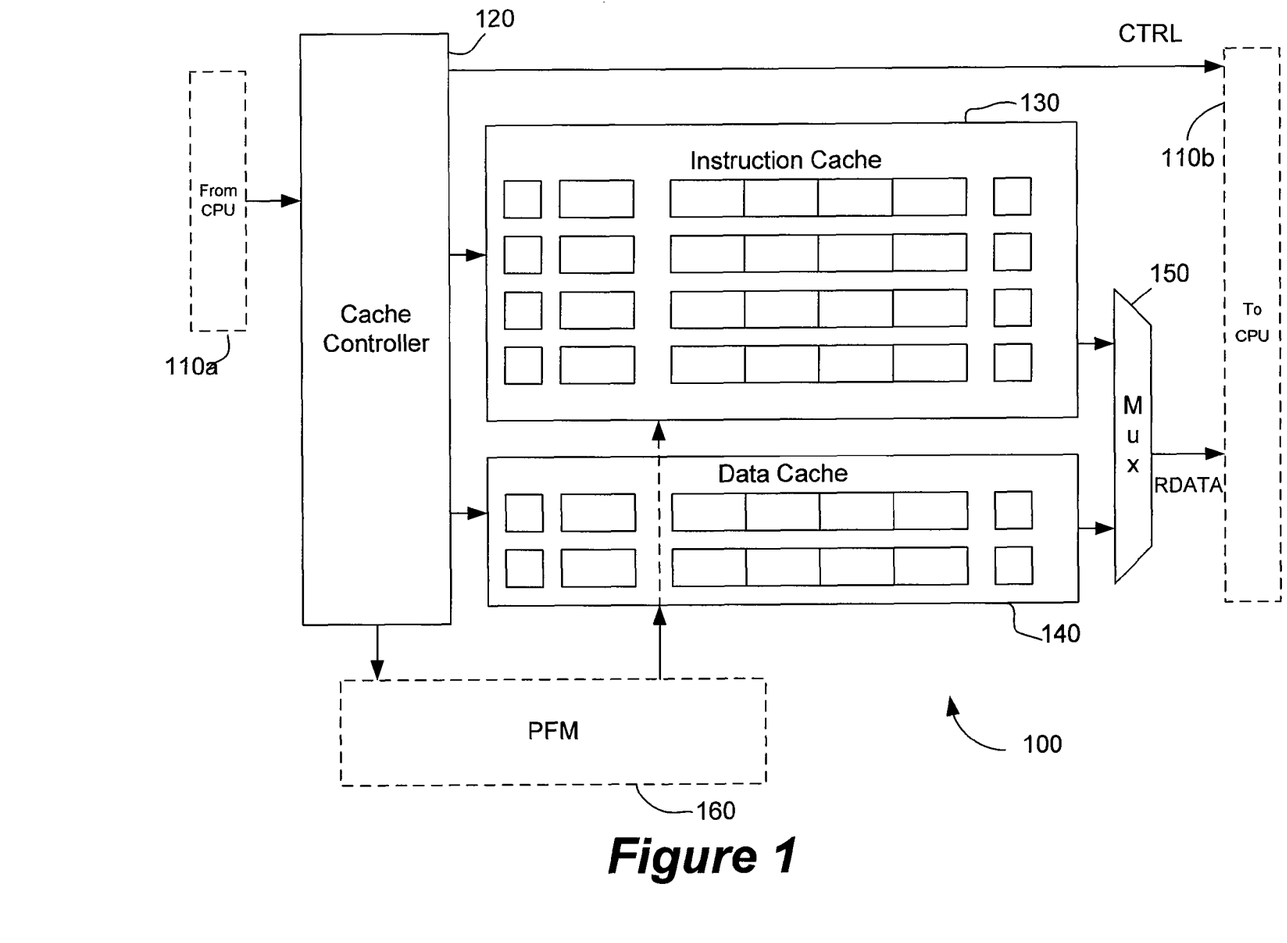
FIG. 1 illustrates a first embodiment of a configurable cache.

According to an embodiment, a cache module can be designed to be a runtime and on-the-fly configurable fully associative cache module. FIG. 1 shows a block diagram of an embodiment of such a configurable cache module 100. Coupling busses 110a and 110b couple the cache to a central processing unit (CPU) of a microcontroller or microprocessor. The cache 100 comprises a cache controller 120 which is coupled to the instruction cache section 130 and the data cache section 140. Each instruction cache section comprises the instruction memory proper and associated control bits and tags, for example, in form of lines wherein a line may include a storage area for storing a plurality of words. For example, a word can be 16 bits long and a line within the instruction cache 130 may have 4 double words resulting in 4×32 bits. According to an embodiment, an small instruction cache 130 may include 4 such lines. According to other embodiments, other configuration depending on the design of the respective processor might be more advantageous. According to an embodiment, a data cache section 140 can be designed similar to the instruction cache design 130. Depending on the design model, separate data and instruction cache sections 130 and 140 may be desirable as for example useful in a processor having a Harvard architecture. However, in a conventional von Neumann type microprocessor, a mixed cache capable of caching instructions and data from the same memory may be used. FIG. 1 only shows a program flash memory 160 (PFM) connected to the instruction and data cache 130, 140 according to a processor with a Harvard architecture. A data memory can be coupled separately in a Harvard architecture or memory 160 may be a unified instruction/data memory as used in a von Neumann architecture. A multiplexer 150 is controlled, for example, by the cache controller 120 and provides the data/instruction stored in the cache memory 130, 140 to the CPU via bus 110b.

Figure 2:
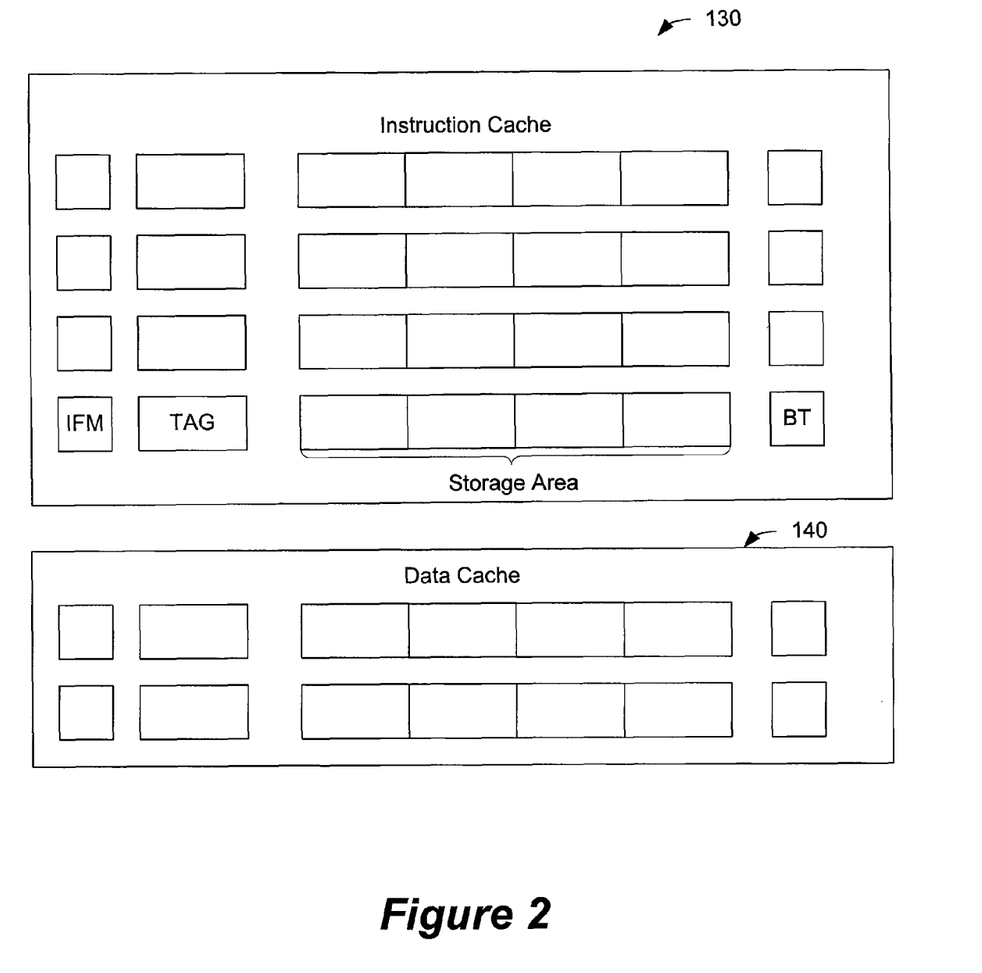
FIG. 2 illustrates details of the cache memory sections according to the embodiment of FIG. 1.

FIG. 2 shows the structure of an instruction cache 130 and data cache according to an embodiment in more detail. The arrangement, again shows separate caches for instruction and data. Each line of a cache comprises a data/instruction Storage Area and a plurality of an associated control and tag bits, for example, IFM, TAG, and BT. IFM designates a particular mask which can be used, for example, to mask certain bits of the address tag field TAG which contains the start address of the data/instruction cache DATA as will be explained in more detail below. Each line can, for example, comprises 4×32 bits of instruction/data cache as shown in FIG. 2. The tag field may comprise the actual address as well as additional bits indicating validity of the respective cache line, locking, type, etc. In addition, as shown in FIG. 2, a branch tail bit BT is provided for each cache line. When this bit is set, the CPU can automatically lock the associated cache line whenever a subroutine call instruction is executed within the respective cache line and that instruction is not the last instruction in the line. In such a case, the respective cache line is automatically locked and the instructions following the respective call instruction will be present in the cache when the program returns from the respective subroutine as will be explained in more detail below.

Figure 3:
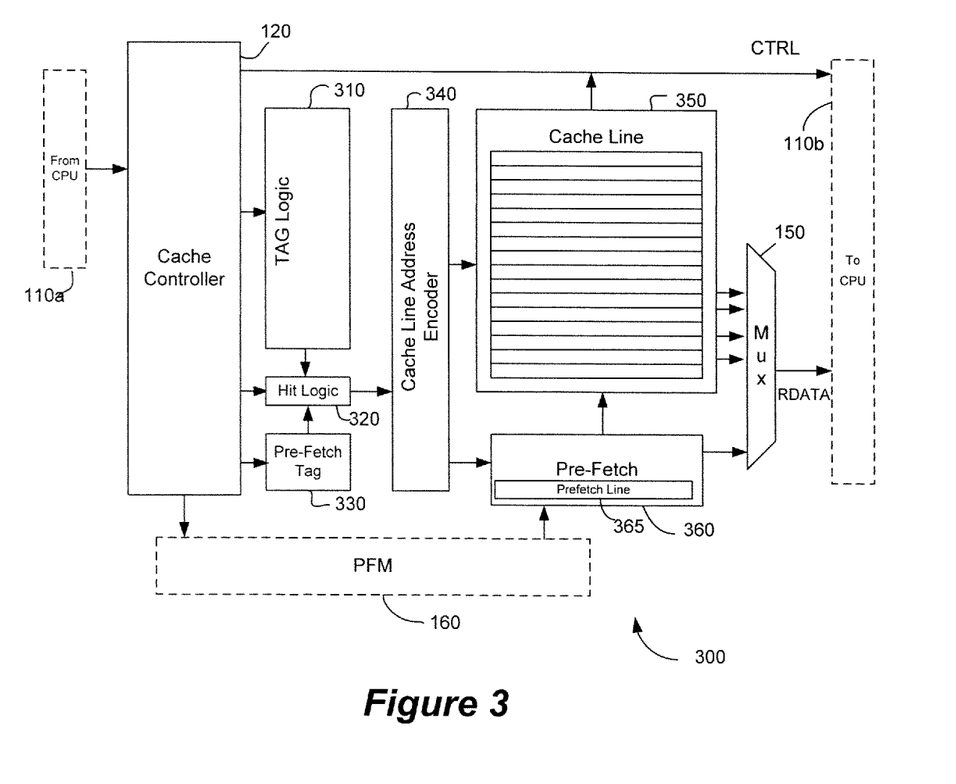
FIG. 3 illustrates a second embodiment of a configurable cache.

FIG. 3 shows another embodiment of a configurable cache. Cache controller 120 provides control signals and information for all functions of the cache. For example, cache controller 120 controls a TAG logic 310 which is coupled with a Hit logic 320 that also processes data from cache controller 120 and from a pre-fetch tag 330 that is provided by the cache controller. The hit logic generates a signal that controls the cache line address encoder 340 which addresses the cache memory 350 which in this embodiment comprises, for example, 16 lines of data/instruction memory each line comprising, for example, 4×32 bit double words for instruction/data storage. The program flash memory 160 is coupled with the cache controller 120 and with the cache via a pre-fetch unit 360 that is also connected to the cache line address encoder 340. The pre-fetch unit 360 transfers instructions into each cache line of cache memory 350 as addressed by the cache line address encoder 340 either directly or through a buffer. To this end, pre-fetch unit 360 may comprise one or more buffers capable of storing the instruction to be transferred into the storage area of a respective cache line. Multiplexer 150 is controlled to select the respective byte/word/double word within cache memory 350 or from the prefetch buffer of unit 360 and provide it to the CPU bus 110b.

Figure 4:
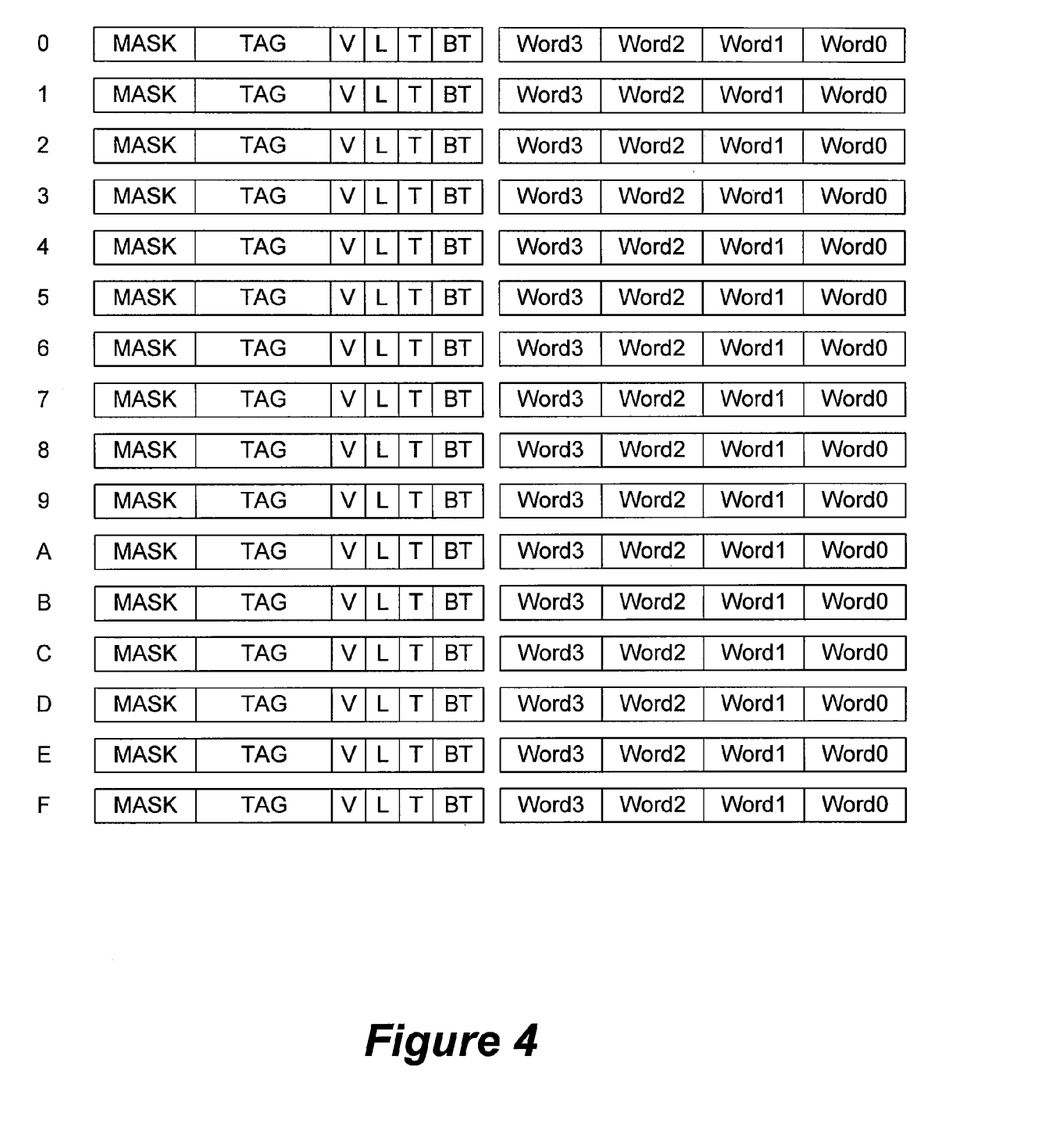
FIG. 4 illustrates details of the cache lines of the cache memory according to the embodiment of FIG. 3.

FIG. 4 shows the cache memory 350 in more detail. In this embodiment, 16 cache lines are provided. Each line comprises a plurality of control bits and a 4×32 Bit instruction/data storage area (Word0-Word3). The control bits comprise a mask MASK, an address tag TAG, a validity bit V, a lock bit L, a type bit T, and a branch trail bit BT. The mask MASK provides for masking selected bits of the address tag TAG during a comparison by the hit logic 320 as will be explained in more detail below. The address tag TAG thereby indicates the beginning of the cache line in memory 160. As will be explained in more detail below, the address tag TAG is readable and writeable and when written by a user will force a pre-fetch function. Validity bit V indicates that the entries in the associated cache line are valid. This bit cannot be altered by a user and is set or reset automatically. Lock bit L indicates whether the cache line is locked and, thus, cannot be overwritten. This bit can be altered by a user or can be set automatically with respect to the branch trail function as explained below. Bit T indicates the type of cache line, i.e. whether the cache line is used as an instruction cache line or as a data cache line. This bit may be designed to be altered by a user which allows for a very flexible assignment and configuration of a cache. Instead of using single assignable bits T to designate certain cache lines as data cache lines, a general configuration register can be used, to define a certain number of lines that will be used to cache data whereas the remaining cache lines will be used for instruction caching. In such an embodiment, Bits T may still be provided to indicate which cache lines are set to be designated data cache lines and therefore cannot be altered in such an embodiment. As will be explained later, the cache according to one embodiment can be, for example, configured to dedicate no cache lines, 1, 2, or 4 cache lines for data cache purposes. Such an assignment can thus split the cache into two parts, for example, data cache lines can be assigned from the bottom of the cache upwards depending on the number of assigned lines. Other configurations with more data cache lines are of course possible and dependent on the respective design of the cache. Hence, when set, bit T indicates that this line is used for data caching.

Figure 7:
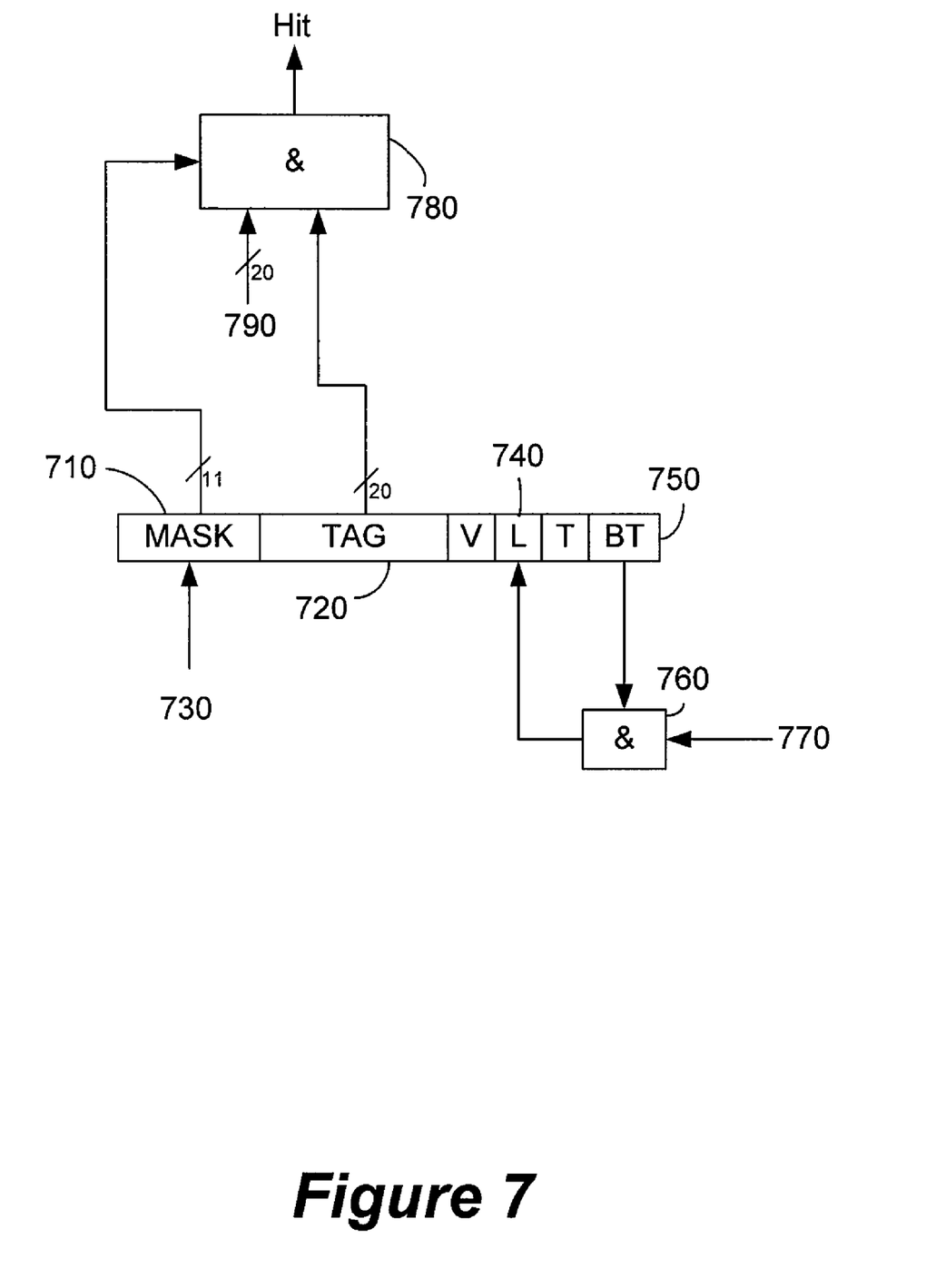
FIG. 7 illustrates some logic circuitry used to generate certain signals.

FIG. 7 shows an embodiment of some logic circuitry that can be used to implement the branch trail function. The branch trail bit 750 is, as explained above, used to automatically lock the associated cache line in case a subroutine instruction, trap, interrupt, or other instruction that will branch away to a subroutine and will return is executed within the cache line and is not the last instruction in the line. When set, the CPU can automatically lock the associated line by setting bit 740 through logic gate 760 when a call subroutine type instruction has been executed and the program branches away from its linear execution sequence. The execution of such a subroutine type instruction can be detected in the execution unit and signaled to logic gate 760 by signal 770. This functionality is enabled when at least one instruction is remaining in the cache line that has not been executed yet but will be executed when the program returns from the respective subroutine. In case such an instruction is placed in the last memory space of a cache line there would be no point in keeping the cache line automatically locked because the following instruction will be in a different cache line or may not even be in the cache yet. The CPU sets and resets the lock bit 740 automatically when bit 750 is set depending on the execution of the respective subroutine or interrupt call which is signaled to logic gate 760 by detection signal 770.

Figure 5:
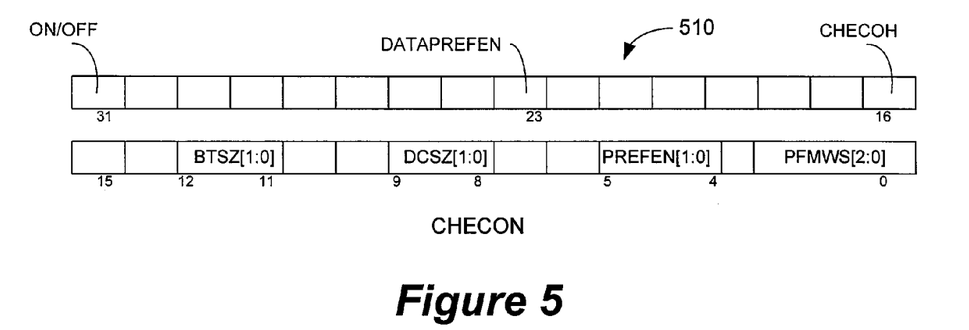
FIG. 5 illustrates an exemplary register used to control functions of an embodiment of a cache.
Figure 6:
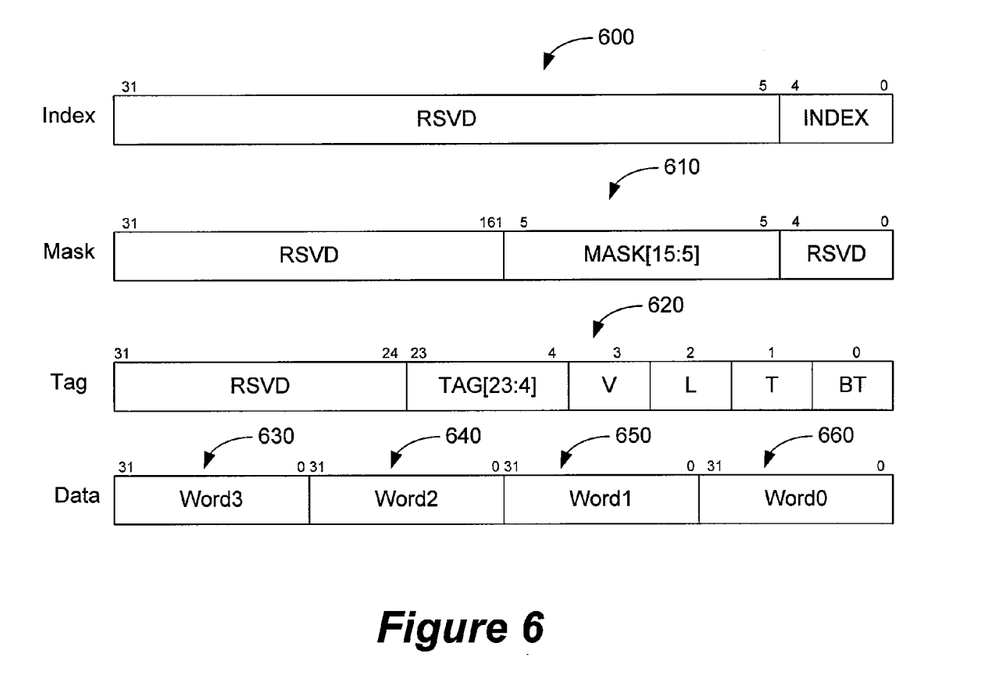
FIG. 6 illustrates further registers mapping the content of a cache line according to one of the embodiments.

FIGS. 5 and 6 show examples of a general cache control register 510 and other control registers 610-660 implemented within a microprocessor or microcontroller to control the behavior and functionality of the configurable cache. All registers can be designed as 32 bit register for use in a 32 bit environment. However, these registers can be easily adapted to work in a 16 or 8 bit environment. For example, register CHECON comprises bit 31 to enable or disable the entire cache and bit 16 CHECOH can be used to provide for a cache coherency setting on a PFM program cycle bit. For example, this bit CHECOH can invalidate all data and instruction lines when set or can invalidate all data lines and only instruction lines that are not locked. Bit 24 can be used to enable a forced data cache function as will be explained in more detail below. When set, this function forces a data cache if the cache bandwidth is not used for fetching instructions. Bits 11-12 BTSZ can be used to enable/disable branch trail tagging. For example, in one embodiment, if enabled the branch trail tagging can be set to a size of 1, 2, or 4 lines. Thus, 1, 2, or 4 cache lines will have this functionality. According to other embodiments, all cache lines may be enabled for such a functionality. Bits 8-9 DCSZ are used to define the number of data cache lines as explained above. In one embodiment, the number can be set to enable zero, 1, 2, or 4 data cache lines.

Bits 4-5 PREFEN can be used to enable predictive prefetch selectively for cacheable and non-cacheable regions of the memory. A cacheable region of a memory can be a region within the memory such as memory or program regions that can be actually cached meaning a memory region that is actually coupled with the cache. Non-cacheable regions generally refer, for example, to memory-mapped peripheral space which usually cannot be cached. The distinction between cacheable and non-cacheable regions depends on the system design. Some embodiments might require such a distinction and respective microprocessor/microcontroller will supports cached and non-cached methodologies whereas other embodiments of processor may be able to cache any type of memory whether they are actual memory regions or memory mapped regions.

If set, the prefetch unit will always fetch the instructions following a cache line from which an instruction is currently issued. Using two bits allows, for example, for four different settings, such as, enable predictive prefetch for both cacheable and non-cacheable regions, enable predictive prefetch for non-cacheable regions only, enable predictive prefetch for cacheable regions only, and disable predictive prefetch. Assuming, according to an embodiment, a cache line comprises 16 bytes or four double words. If the central processing unit, for example, requests instruction x1 from address 0x00000, the cache control logic compares all address tags with 0x00100X (wherein bits X are ignored). If the controller generates a hit, the respective line is selected. The selected line comprises all instructions starting with address 0x00000. Thus, in case each instruction is 32 bit long, the first instruction will be issued to the central processing unit and the prefetch unit will be triggered to prefetch the next line of instructions. To this end, the prefetch unit will calculate the following address tag as 0x001010 and start loading the respective instructions in the next available cache line. While the central processing unit further executes instructions from addresses 0x001004, 0x001008, and 0x00100C, the prefetch unit fills up the next available cache line with instructions from addresses 0x00010, 0x001014, 0x001018, and 0x00101C. Before the central processing unit finishes executing the instructions of the currently selected cache line, the prefetch unit will be done with loading up the next instructions. Thus, central processing unit will not be stalled.

Referring back to FIG. 5, Bits 0-2 are used to define the number of wait states of a program flash memory. Thus, a wide variety of different flash memories can be used with the microcontroller.

Each line within a cache as shown in FIG. 4 may be mapped under control to registers as shown in FIG. 6. Thus, a cache line can be designed to fully accessible through read and write operations and can be fully altered by a user. However, as stated above, some bits of a cache line may be designed not to be altered by a user or may require an unlocking of the respective line before a user can alter the respective line. To this end, an index register 600 can be provided for selecting one of the 16 cache lines. Once a cache line has been selected through the index register 600, the cache line is accessible through the following registers 610-660. A mask register may comprise, for example, in bits 5-15 the mask MASK of the selected cache line. A second register for the tag may have the address tag in bits 4-23 and also may comprise the bits V, L, T, and BT indicating the validity, lock status, type and branch trail function of the selected register. Finally four 32 bit registers may be provided for the selected line comprising the cached data or instructions in registers Word0, Word 1, Word2, and Word3. Other control register may be implemented to control general functions of a cache. Thus, each cache line can be accessed and manipulated by a user or software as will be explained in more detail below.

According to the embodiments disclosed, a cache module 100, 300 is designed to respond to an initial CPU instruction fetch by fetching, for example, a 128-bit aligned set of instruction words called a line form the PFM 160. The actual instruction requested can exist anywhere in the line. The line is stored in the instruction cache 130 (or data/instruction cache 350) (a fill) and the instruction is returned to the CPU. This access can take multiple clock cycles and stall the CPU. For example, for a 40 nanosecond access Flash, an access may cause 3 wait states at 80 MHz. However, once a line is cached, subsequent accesses to instruction addresses that exist in that line occur in zero wait states.

If Caching is all that is enabled, this process continues for every instruction address that does not hit a cache line. In this way a small loop can be executed from the cache at zero wait state if the loop is 128-bit aligned and the same number of bytes or fewer than that of the cache 130, 350. For a loop that completely fills a 4 line cache 130, as shown in FIG. 1, with 32-bit instructions, executes one instruction per clock. In other words, the CPU executes all the instructions stored in cache 130 in 16 clocks. If only 128-bit wide fetching is supported that same loop may take a certain number of wait states per line for fetching, for example 3 wait states, and a certain number of clocks for execution, for example 4 clocks, which would results, for example, in 7 clocks for every 4 instruction. This example would yield a total loop time of 28 clocks.

The embodiment in FIG. 1 comprises a two line data cache to take advantage of spatial proximity of constants and table data which may be stored in the PFM 160. However, in other embodiments, this cache may be larger and connected to the data memory.

In addition, a cache as shown in FIGS. 1 and 3 may also provide for prefetching, as explained above, to allow for avoiding the certain number of wait states required for fetching a 128-bit wide instruction stream. If prefetching is enabled, the cache module 100, 300 uses the least recently used line for predicted address fills. The predicted address is just the next sequential 128-bit aligned address as explained above in detail with the example using actual addresses. Thus, during execution of instructions within a cache line, if the predicted address is not already in the cache, the cache generates a flash memory access. When the CPU is running at a frequency that requires, for example, 3 wait state access to the flash memory system, the predicted address fetch completes in the cycle in which the CPU requires the predicted instruction. In this way the CPU instruction fetches can run at zero wait state for linear code.

The Branch Trail feature looks at linked-branch and linked-jump instructions as they execute in the CPU to save a cache line for future use. This feature increases performance of function call returns by saving any instructions in the line trailing the branch or jump instruction.

The Program Flash Memory Cache 160 and Prefetch module 120, 360 provide increased performance for applications executing out of the cacheable program flash memory region. Performance increases are realized in three different ways.

The first is the modules caching ability. The 4 or 16 line instruction cache 130, 350 as shown in FIGS. 1 and 3 have the ability to supply instructions once per clock for loops up to 16/64 instruction for 32-bit opcodes and up to 32/128 instructions for 16-bit opcodes. Other configuration of cache size and organization may apply. The embodiment shown in FIG. 1 also provides the ability to cache two lines of data providing improved access for data item within the line. The embodiment shown in FIG. 3 provides for a more flexible assignable data cache line size by setting a split point or individually assigning the respective cache type as explained above.

Secondly, when prefetching is allowed the module provides instructions once per clock for linear code, hiding the access time of the flash memory. Thirdly, the module can allocate one or two instruction cache lines to linked-branch history instructions. When a jump or branch with link instruction occurs in the CPU, the last line is marked as a branch history line and saved for the return from the call.

Module Enable

According to an embodiment, after reset the module may be enabled by setting a bit, for example, bit 31 ON/OFF in the CHECON register (See FIG. 5). Clearing this bit will do the following:
Disable all Cache, Prefetch and Branch History Functionality and resets the state of the Cache/
Set the module to bypass mode.
Allow special function register (SFR) reads and writes.

Operation in Power Save Modes

Sleep Mode
According to an embodiment, when the device enters SLEEP mode, the clock control block stops the clock to the cache module 100, 300.

Idle Mode
According to an embodiment, when the device enters IDLE mode, the Cache and Prefetch clock source remains functional and the CPU stops executing code. Any outstanding prefetch completes before the module 100, 300 stops its clock via automatic clock gating.

Bypass Behavior
According to an embodiment, the default mode of operation is bypass. In bypass mode, the module accesses the PFM for every instruction, incurring the flash access time as defined by the PFMWS bits in register CHECON (See FIG. 5).

Cache Behavior
According to FIG. 1, the Cache and Prefetch module may implement a fully associative 4 line instruction cache. Depending on the design, more or less cache lines can be provided. The instruction/data storage area within a cache line may be designed to be not writeable and is cleared together with the associated control bits during a flash programming sequence or when a respective bit in the general control register CHECON is set to logic 0. It uses a register or bit field per line that contains the flash address tag. Each line may consists of 128 bits (16 bytes) of instruction regardless of the instruction size. To simplify access, the Cache and Prefetch module according to FIGS. 1 and 3 may only request 16-byte aligned instruction data from the Flash 160. According to an embodiment, if the CPU requested address is not aligned to a 16-byte boundary, the module will align the address by dropping address bits [3.0].

When configured only as a cache, the module behaves as any cache does by loading multiple instruction into a line on a miss. According to an embodiment, the module may use a simple least recently used (LRU) algorithm to select which line receives the new set of instructions. The cache controller uses the wait state values of register CHECON to determine how long it must wait for a flash access when it detects a miss. On a hit, the cache returns data in zero wait states.

The instruction cache behaves in different ways depending on prefetch and branch trail selection. If the code is 100% linear, the cache only mode will provide instructions back to the CPU with a respective PFMWS cycle timing, where PFMWS is the number of wait states.

Masking

Using the mask bit field provides for a further flexible use of a cache. FIG. 7 shows a possible logic circuitry used to implement the masking function. Bit field 710 of a cache line contains for example 11 bits which can be used to mask certain bits of the address tag 720. The 11 bits of mask bit field 710 are used to mask the lower bits 0-10 of address tag 720. Any bit set to "1" in the mask bit field 710 will cause the respective bit in the address tag to be ignored when comparator 780 compares the address tag 720 with the requested address 790. If an instruction/data storage area comprises 16 bytes, the address tag does not comprise the lower 4 bits of an actual address. Thus, if all bits of mask 710 are set to "1", bits 4-23 of the actual address are compared by comparator with bits 0-19 of the address tag in a system that uses 24 address bits. However, through mask 730, comparator 780 can be forced to only compare a fraction of the address tag 720 with a respective fraction of the actual address 790. Thus, a plurality of addresses can cause a hit. This, functionality can be advantageously used in particular with the generation of certain interrupts or trap instructions that cause a branch to predefined addresses in the instruction memory. For example, interrupts may cause a branch to a memory address containing an interrupt service routine defined by a interrupt base address plus an offset address defined by the priority of the interrupt. For example, a priority 0 interrupt will branch to address 0x000100, a priority 1 interrupt to address 0x000110, a priority 2 interrupt to address 0x000120, etc. Trap instructions can be organized similarly and may cause a similar branch pattern. Assuming a certain number of interrupt service routines are at least for the a predefined number of instructions identical, then by using the masking function, these addresses can cause a branch to the same cache line containing the start of the service routine. For example, if the first four 32 bit instructions for interrupt service routines for priority levels 0-3 are identical, mask bit field of the cache line that comprises the instructions starting at address 0x000010 can be set to "11111111100" which will cause a hit for all addresses starting from 0x00000 to 0x0001300. Thus, not only interrupts with priority 0 will cause a hit but also interrupts with priority 1, 2, and 3. They all will jump to the same instruction sequence which is already loaded in the cache. Thus, no penalties for accessing the flash memory will occur.

Prefetch Behavior

Bitfield PREFEN or a respective single bit of control register CHECON (See FIG. 5) can be used to enable a prefetch function. When configured for prefetch, the module 100, 300 predicts the next line address and returns it into the LRU line of the cache 130, 350. The prefetch function starts predicting based on the first CPU instruction fetch. When the first line is placed in the cache 130, 350, the module simply increments the address to the next 16-byte aligned address and starts a flash access. The flash memory 160 returns the next set of instructions on or before all instructions can be executed from the previous line.

If at any time during a predicted flash access, a new CPU address does not match the predicted one, the flash access will be changed to the correct address. This behavior does not cause the CPU access to take any longer than without prediction.

If the predicted flash access completes, the instructions are placed in the LRU line along with its address tag. The LRU indication is not updated until the CPU address hits a line. If it is the line just prefetched, that line is marked as the most recently used line and other lines are updated accordingly. If it is another line in the cache, then the algorithm adjusts accordingly, but the just prefetched line is still the LRU line. If it misses the cache 130, 350, access passes to the flash and the returning instructions are placed in the LRU line (which was the most recently updated, but never used, prefetched line).

According to an embodiment, as stated above, data prefetching can be selectively turned on or off. According to another embodiment, a data access in the middle of an instruction prefetch may cause the instruction prefetch to abort, if a dedicated bit in a control register such as CHECON is set to a logic 1. If such a bit is set to logic 0, the data access completes after the instruction prefetch completes.

Branch Trail Behavior

The cache can be split to dedicate one or more lines of the instruction cache to branch trail instructions, for example, by programming bit field BTSZ in register CHECON (See FIG. 5). A branch trail line is the most recently used cache line when the CPU requests a new address as calculated from a branch and link or jump and link instruction. According to an embodiment, when the module 100, 300 marks the MRU cache line as a branch trail line, it may also de-allocates the LRU branch trail line, returning it to general cache use.

As explained above, if the last access is from the last instruction (highest address) in the MRU line then the line is not marked as a branch trail line. Also, the module does not de-allocate either of existing lines from the branch trail portion of the cache.

Preload Behavior

Application code can direct the module 100, 300 to preload and lock one cache line with instructions from the flash memory 160. The Preload function uses the LRU from the lines marked as cache (i.e. not Branch Trail).

According to an embodiment, the address tag bit field in a cache line can be directly accessed and a user can write any value into such a bit field. Such a write causes a forced preload caching of the respectively line addressed in the flash memory. Therefore, the preload works by writing the address into the address tag bit field of a cache line to preload to the respective line from the memory. According to an embodiment, this action invalidates the line before accessing the flash to retrieve the instructions. After preloading, the line is accessible for the central processing unit for execution of respective instruction.

According to an embodiment, this functionality can be used to implement very flexible debug functionality without the need to alter the code in the program memory. Once a respective line including the instructions which during a debug sequence require a break point is identified, the line can be tagged an preloaded with a particular address. Then the contents of that cache line can be modified to include a debug instruction. For example, the system software can automatically replace an instruction within that cache line to generate a break point or to execute any other type of subroutine. Once the respective code has been executed, the instruction can be replaced with the original instruction and the stack can be altered to return to the same address from which the debug routine has been executed. Thus, the preload functionality allows for a very flexible alteration of code within the system.

According to yet another embodiment, if a cache line is locked either by the lock bit or potentially locked by the branch trail bit, a write access to such a cache line can be prohibited. Thus, only cache lines that are unlocked may be writable. If such a functionality is implemented, a user must first unlock a cache line before he can write a new address tag into the cache line to force the cache controller the load the respective instructions or data from the memory. The same counts for write accesses to the instruction/data storage area.

The feature of actively loading the cache with designated instructions can be very useful in particular with respect to the masking function as explained above. For example, if a number of interrupt service routines start with the same instruction sequence, this instruction sequence can be forced into the cache by writing the respective service routine address into the address tag causing a preloading of the respective cache line with the respective interrupt service routine instructions. By setting the respective mask as explained above and locking the respective cache line, the cache can be pre-configured for a program to react to certain interrupts without flash access penalties. Certain routines can, thus, always be accessible through the cache.

Reset & Initialization

Upon reset, all cache lines are marked as invalid and the cache features are disabled. For example, through register CHECON the wait states are reset to its max wait state value (allowing for bypass accesses after reset).

At the beginning of any flash program the module 100, 300 forces the cache to its reset values. Any access by the CPU is stalled until the program cycle is over. Once, the program cycle completes, the pending CPU access continues via bypass to the flash. The returning instructions complete per the values defined in the configuration registers.

Flash Prefetch Buffer (FPB)

According to an embodiment, the Flash prefetch buffer design (See FIG. 3) can be a simple buffer such as a latch or a register 365. It can be designed in one embodiment to allow for prefetching of CPU core instructions of up to 8 total instructions when operating in 16-bit instruction mode or 4 instructions operating in 32-bit instruction mode utilizing 4 panels of x32-bit FLASH memory. The FPB implemented in the cache controller 120 prefetches in linear fashion to ensure instructions fed into the Core will not stall the Core instruction. According to an embodiment, the FPB may contain 2 buffers of 16 bytes each. Each buffer keeps track of the instruction address fetch. If branches occur beyond the buffer instruction boundary, the alternate buffer is utilized (an initial stall is incurred but then linear code fetches are cached). Each instruction fetch forces the FPB to grab the next linear possible 16 bytes to fill the buffer.

According to a further embodiment, optionally, a programmable forced data cache operation can be implemented through the prefetch buffer. Once a cache is filled with one or more lines of instructions, the instructions may be executed sequentially without the need of fetching further instruction lines for a certain period of time. This is particularly true because the execution time of instructions within a single cache line may be twice as long or even longer as the time to load a cache line into the cache. Moreover, if one or a plurality of consecutive cache lines include a loop that is executed, there might exist a relatively long time during which no further instructions need to be cached. According to an embodiment, this time could be used to cache data, for example a relatively large amount of data to be used in a table, etc. The cache can be programmable by a register, for example bit 23 DATAPREFEN in register CHECON (See FIG. 5), to perform additional data cache functions while the cache bandwidth is not used for fetching instructions. This can be useful if a table of data is used by a program that needs to be loaded into the cache. The data fetch can occur after the first initial fill and still allow the core to continue using the prefetched instructions from the cache line. According to an embodiment, when the function bit DATAPREFEN is set, a line of data can be automatically fetched after each instruction fetch. Alternatively, according to another embodiment, data caching can be forced as long as the respective bit DATAPREFEN is set. Thus, for example, a forced data caching could be started and stopped by setting the respective bit. In yet another embodiment, the forced data caching could be performed automatically whenever the cache is inactive with loading instructions for a time period. If multiple control bits are provided, a programmable combination of the different data caching modes could be implemented.

Figure 8:
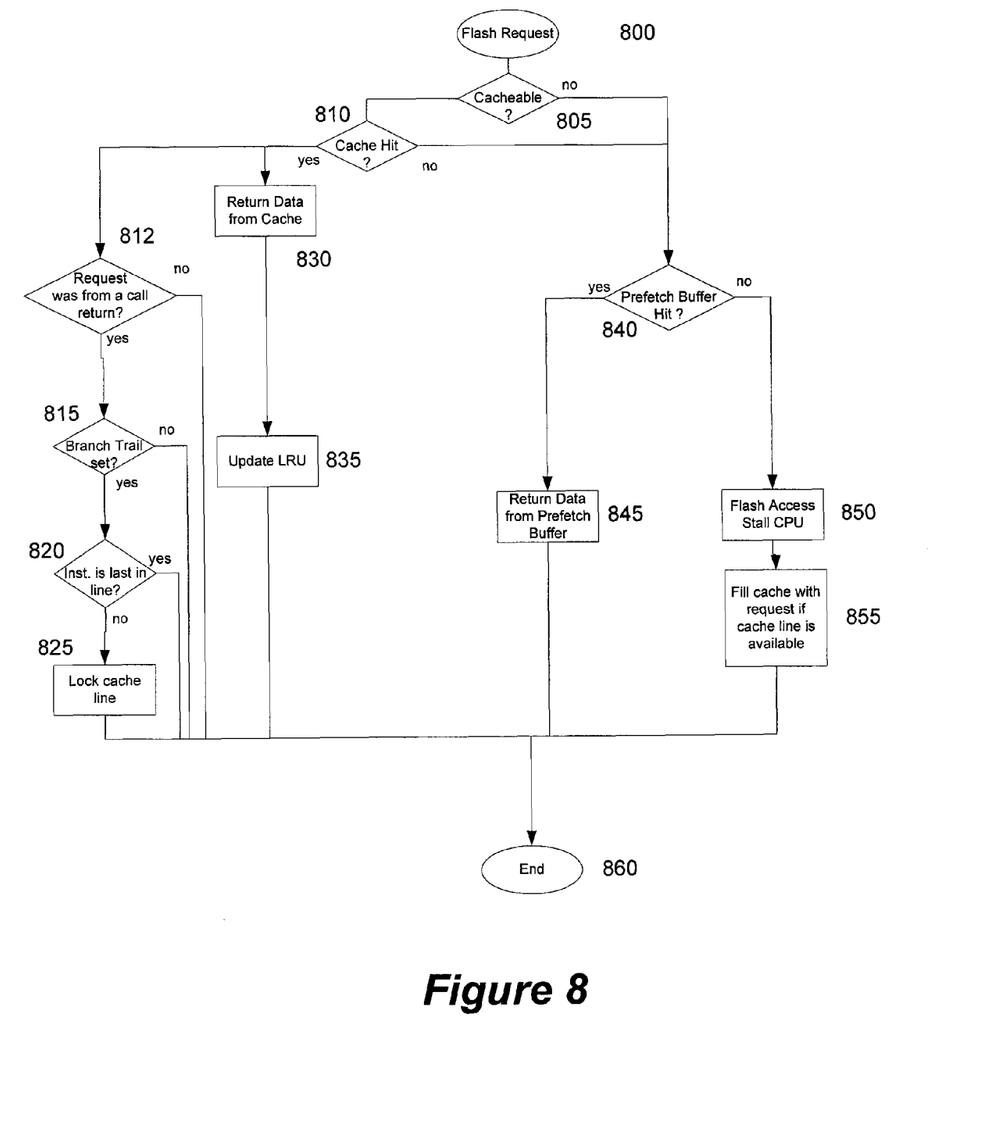
FIG. 8 illustrates a flow chart showing a simplified cache access process.

FIG. 8 shows a simplified flash memory request using the cache and prefetch function according to an embodiment. A flash memory request starts at step 800. First, it is determined whether the request is cacheable or not in step 805. If the request is cacheable, then in step 810 it is determined whether the provided address generated a cache hit or not. If yes, according to an embodiment, the process may branch into two parallel processes. However, other embodiments may execute these processes sequential. The first branch starts with step 812 in which it is determined whether a call to a subroutine has been requested. If not, then the first parallel process ends. If yes, then it is determined whether the branch trail bit has been set in the respective cache line in step 815. If yes, then it is determined whether the call was the last instruction in the cached line in step 820. If yes, the first parallel process ends. If yes, then the respective cache line is locked in step 830. The second parallel process starts in step 835 where the instruction is returned from the cache and in step 835, the last recently used algorithm is executed to update the status of the cache lines. If no cache hit has been generated in step 810 or if the request is not cacheable then it is determined whether the prefetch buffer produces a hit in step 840. If the prefetch buffer contains the requested instructions, then in step 845 the requested instruction is returned. Otherwise, a flash access is performed in step 850 which will stall the CPU. In step 855 following step 850 the flash request may fill a cache line in case a cache line is available for performing the cache function. The routine ends with step 860.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A cache module for a central processing unit comprising:
a cache control unit coupled with a memory, said cache control unit receiving a requested address from a central processing unit (CPU),
a cache memory coupled with said cache control unit and said memory, wherein said cache memory comprises a plurality of cache lines, at least one cache line of said plurality of cache lines comprises an address tag bit field and an associated storage area for storing instructions to be issued sequentially and at least one control bit field, wherein said control bit field is coupled with said address tag bit field to mask a predefined number of bits in said address tag bit field, and wherein said cache control unit is operable to compare bits of said address tag bit field that are not masked by said mask with respective bits of said requested address to generate a cache line hit signal.

2. The cache module according to claim 1, wherein said at least one cache line further comprises at least one locking bit for locking of the associated cache line.

3. The cache module according to claim 1, wherein each cache line comprises at least one locking bit for locking of the associated cache line.

4. The cache module according to claim 3, wherein each cache line further comprises at least one branch trail bit for automatic locking of the associated cache line, wherein in case said branch trail bit is set said locking bit is automatically set in case a predefined branch instruction in said associated storage area has been issued.

5. The cache module according to claim 1, wherein each cache line further comprises a validity control bit for indicating the validity of the associated cache line.

6. The cache module according to claim 1, wherein each cache line further comprises a type control bit for indicating whether said cache line is used as an instruction cache line or a data cache line.

7. The cache module according to claim 1, further comprising a prefetch unit coupled between said memory and said cache memory, wherein said prefetch unit is operable to load instructions from said memory into another cache line wherein said instructions are sequential to instructions which are currently issued from said cache line.

8. The cache module according to claim 1, wherein a least recently used algorithm is used to determine which cache line is to be overwritten.

9. A method of operating a cache having a plurality of cache lines for a central processing unit comprising the steps of:
storing a plurality of sequential instructions within a cache line of said cache and an associated memory address of said sequential instructions in an associated address tag bit field of said cache line;
storing a mask in a mask bit field of said cache line;
receiving an instruction address request from the central processing unit;
comparing a partial address generated by masking the associated address tag bit field with said mask bit field with respective bits of said instruction address request to generate a hit signal;
forwarding an instruction from said cache line to said central processing unit if a hit signal has been generated.

10. The method according to claim 9, wherein the instruction address request is generated by an interrupt or by a trap instruction.

11. The method according to claim 10, wherein said interrupt or trap instruction generate an address that consists of a base address and an offset address, wherein said offset address is generated by an interrupt priority or by a trap number, respectively.

12. The method according to claim 9, further comprising the step of locking said cache line.

13. The method according to claim 9, further comprising:
storing a plurality of sequential instructions within another cache line of said cache;
setting a branch trail function for said another cache line;
executing instructions fetched from said another cache line;
automatically locking said another cache line upon calling a subroutine.

14. The method according to claim 13, further comprising the step of resetting said branch trail function for said another cache line upon a return from said subroutine.

15. The method according to claim 13, wherein said subroutine is called upon execution of an instruction contained in said another cache line.

16. A microcontroller comprising:
a central processing unit;
a cache module coupled with said central processing unit, said cache control unit receiving a requested address from the central processing unit and comprising:
a cache control unit coupled with a memory,
a cache memory coupled with said cache control unit and said memory, wherein said cache memory comprises a plurality of cache lines, at least one cache line of said plurality of cache lines comprises an address tag bit field and an associated storage area for storing instructions to be issued sequentially and at least one control bit field, wherein said control bit field is coupled with said address tag bit field to mask a predefined number of bits in said address tag bit field, and wherein said cache control unit is operable to compare bits of said address tag bit field that are not masked by said mask with respective bits of said requested address to generate a cache line hit signal.

17. The microcontroller according to claim 16, wherein said at least one cache line further comprises at least one locking bit for locking of the associated cache line.

18. The microcontroller according to claim 16, wherein each cache line comprises at least one locking bit for locking of the associated cache line.

19. The microcontroller according to claim 18, wherein each cache line further comprises at least one branch trail bit for automatic locking of the associated cache line, wherein in case said branch trail bit is set said locking bit is automatically set in case a predefined branch instruction in said associated storage area has been issued.

20. The microcontroller according to claim 16, wherein each cache line further comprises a validity control bit for indicating the validity of the associated cache line.

* * * * *